United States Patent [19]
Ulrich et al.

[11] Patent Number: 5,783,119
[45] Date of Patent: Jul. 21, 1998

[54] LIQUID DISTRIBUTOR FOR COLUMNS

[75] Inventors: Herbert Ulrich, Ettenhausen; Emil Fehr, Berg am Irchel, both of Switzerland

[73] Assignee: Sulzer Chemtech AG, Winterthur, Switzerland

[21] Appl. No.: 776,359

[22] PCT Filed: Sep. 12, 1995

[86] PCT No.: PCT/CH95/00203

§ 371 Date: Jan. 24, 1997

§ 102(e) Date: Jan. 24, 1997

[87] PCT Pub. No.: WO96/09873

PCT Pub. Date: Apr. 4, 1996

[30] Foreign Application Priority Data

Sep. 28, 1994 [EP] European Pat. Off. ............. 94810564

[51] Int. Cl.[6] ........................................... B01F 3/04
[52] U.S. Cl. ........................................... 261/97; 261/110
[58] Field of Search ................. 261/97, 110; 55/241; 202/158; 239/504

[56] References Cited

U.S. PATENT DOCUMENTS

| | | | |
|---|---|---|---|
| 2,632,638 | 3/1953 | Turner | 261/97 |
| 3,006,623 | 10/1961 | Ross et al. | 261/110 |
| 3,363,843 | 1/1968 | Ballard et al. | 261/97 |
| 4,816,191 | 3/1989 | Berven | 261/97 |
| 4,855,089 | 8/1989 | Michels | 261/97 |
| 5,192,465 | 3/1993 | Petrich et al. | 261/97 |
| 5,250,234 | 10/1993 | Meyer et al. | 261/97 |

FOREIGN PATENT DOCUMENTS

| | | | |
|---|---|---|---|
| 0 112 978 | 7/1984 | European Pat. Off. | |
| 0 501 615 | 9/1992 | European Pat. Off. | |
| 830669 | 5/1961 | France | 261/97 |
| 2 691 372 | 11/1993 | France | |
| 1156428 | 10/1963 | Germany | |
| 2945103 | 5/1981 | Germany | 261/97 |

*Primary Examiner*—Richard L. Chiesa
*Attorney, Agent, or Firm*—Townsend and Townsend and Crew LLP

[57] ABSTRACT

The liquid distributor for columns has liquid outlet openings and fine distribution elements with a guide wall associated with them. A preselectable amount of liquid can be supplied into the associated fine distribution element via each outlet opening. A plate-like element communicating with the guide wall is arranged in each fine distribution element, with a communicating chain of capillary openings forming a distribution zone and drain-off zone between the edge of the element and the guide wall. This chain extends along a horizontal, closed curve.

17 Claims, 3 Drawing Sheets

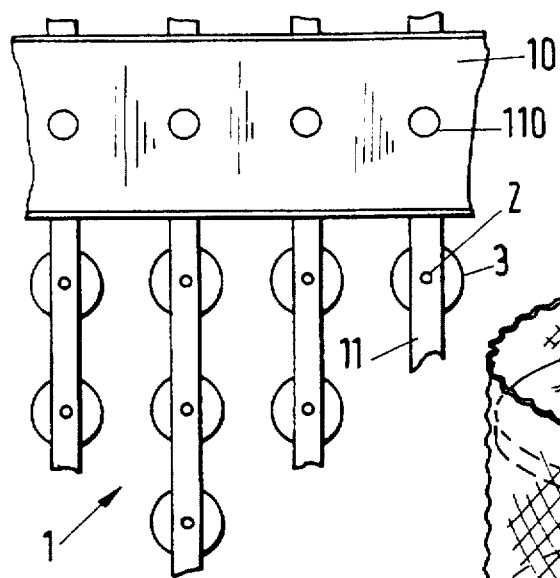
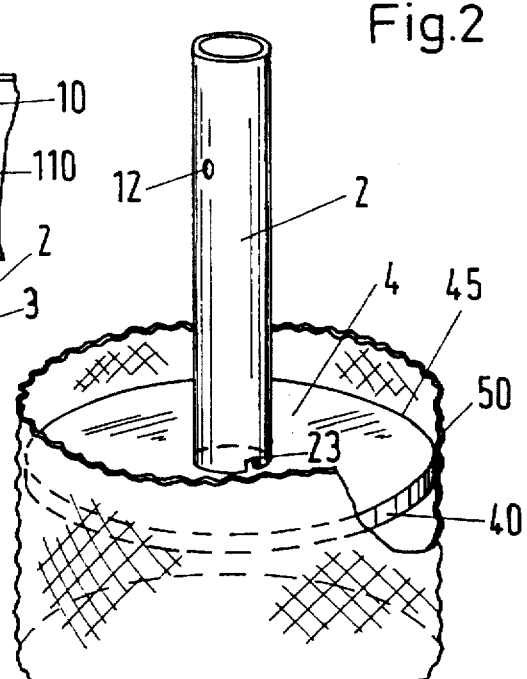
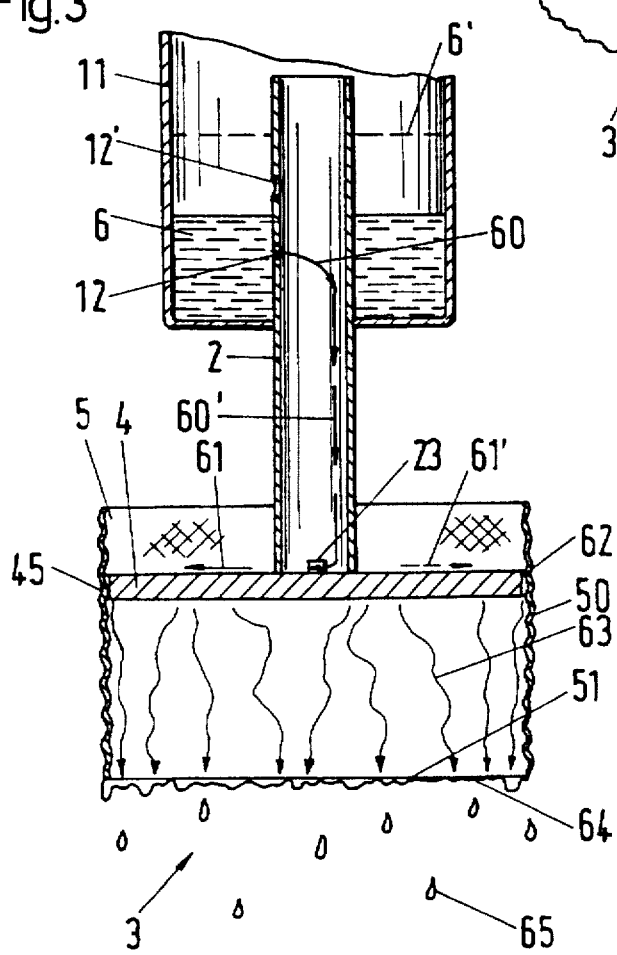
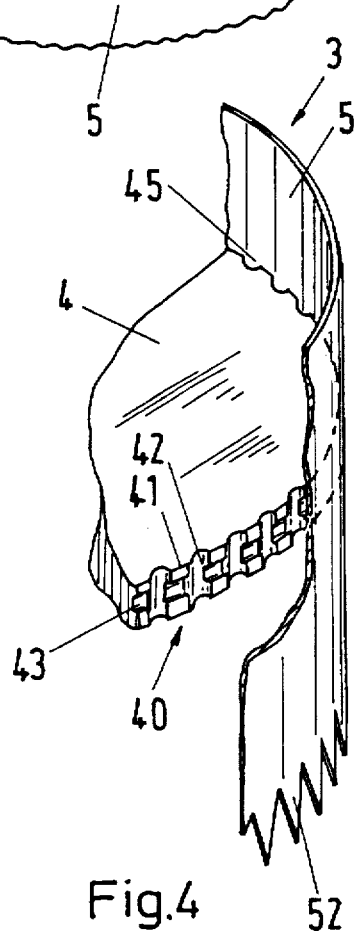

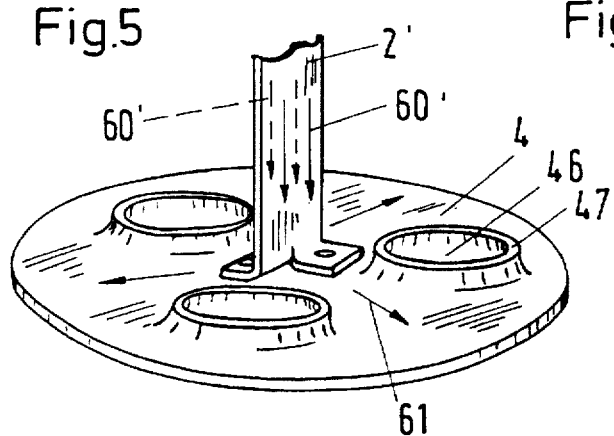
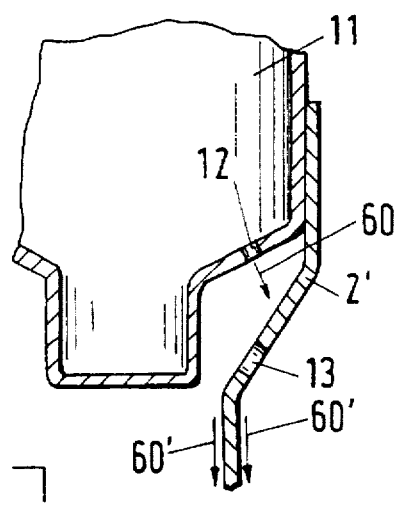
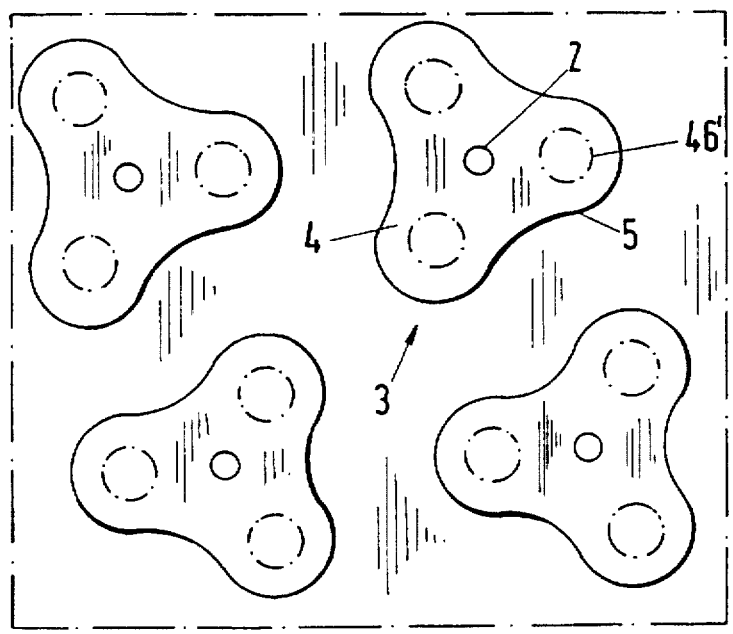
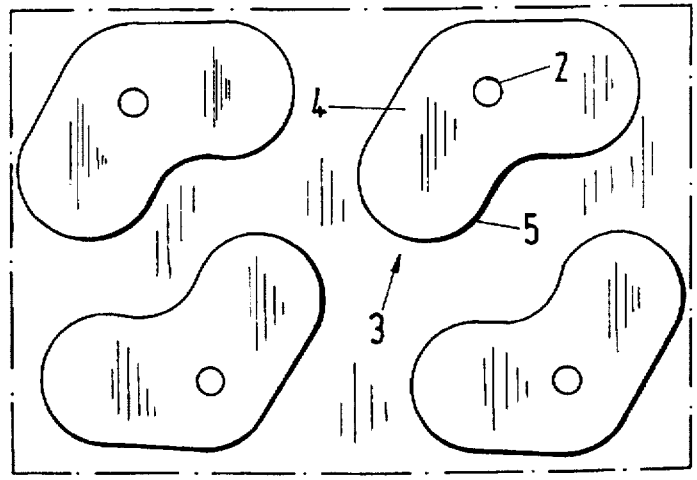

1

LIQUID DISTRIBUTOR FOR COLUMNS

REFERENCE TO PRIORITY APPLICATION

This application is a §371 of PCT/CH95/00203 Sep. 12, 1995.

BACKGROUND OF THE INVENTION

1. Field of the Invention

The invention relates to a liquid distributor for columns. Such a liquid distributor is, for example, provided for substance exchanger columns and heat exchanger columns or also for catalytic fixed bed reactors.

2. Description of the Related Art

Such a distribution apparatus is known from DE-PS 27 52 391. It consists of U-shaped, upwardly open channels which are arranged parallel to one another and which have V-slit-shaped liquid outlet openings at the upper edge of the turned-up limbs. Continuous guide walls are placed at a small distance in front of the outlet openings. For the use of this apparatus in the low load region, provision is made to insert a wire mesh in the gap between the guide wall and the channel limb, via which the liquid is distributed over the gap by means of capillary forces. Since this known apparatus is substantially an overflow system and is thus very sensitive to inclined positions, it is practically impossible to discharge preselectable amounts of liquid via the individual outlet openings.

In other known liquid distributors (see for example CH-PS 658 198=P.5779), in which the outlet openings are hole-shaped and in which a driving pressure difference is generated via banking of the liquid (banking height at least approximately 25 mm), the discharged amount of liquid per hole can easily be preselected. However, these apparatuses cannot be used in the low load region since a sufficient number of dripping points per unit of area cannot be manufactured with them.

The requirement for a low load distributor is that a minimum amount of 25 l/m² can be uniformly distributed per hour over the column cross-section on a column packing. The expression "uniform" means that the liquid—depending on the fineness of the packing structure—is supplied via at least 80 to 200 drip points per square meter of the column cross-section.

The hole diameter should not fall short of a minimum size for different reasons. For example, there is danger of clogging the holes with dirt particles which are in the liquid to be distributed. The lower limit for the hole diameter is approximately 1.5 mm for reasons of manufacturing technology and discharge flow conditions. This means that for a banking height of 25 mm, a discharge amount of approximately 3 l/h results. This means that at least 24 drip points must be allocated to each outlet opening in the extreme case with at least 200 drip points/m² and 25 l/m²h (or 0.125 l/h per drip point).

SUMMARY OF THE INVENTION

It is the object of the invention to provide a low load distributor with which a uniform distribution for the precedingly named extreme case can be achieved.

The fine distribution results because of capillary forces in a manner similar to DE-PS 27 52 391. However, the difference is that the distribution occurs over a distribution zone and drain-off zone which extends along a horizontal, closed curve. No edge effects result which could lead to a deviation from the uniform distribution because of this particular feature, specifically, the curve being closed.

Surprisingly, it has been shown that a good distribution can also be achieved without banking of liquid in the fine distribution element. Because of this characteristic, the fine distribution element functions over a wide load region which at least comprises one order of magnitude.

The lower edge of the guide wall extends preferably parallel to the named curve of the distribution zone and drain-off zone; then the drip points are distributed practically continuously over the lower edge of the guide wall so that the requirement with regard to the amount of drip points is fulfilled. The lower edge can also be indented; then a drip point corresponds to each indentation and the amount of drip points can thus be preselected by the number of indentations.

BRIEF DESCRIPTION OF THE DRAWINGS

FIG. 1 shows a plan view on a distributor in accordance with the invention, represented as a cutout.

FIG. 2 shows an oblique picture of a fine distribution element.

FIG. 3 shows a longitudinal section through a fine distribution element in accordance with FIG. 2.

FIG. 4 shows a detail of a second embodiment of the distributor in accordance with the invention.

FIG. 5 shows a plate-like element of the fine distributor with openings.

FIG. 6 shows a cross-section through the bottom of a distributor channel.

FIG. 7 shows a cutout of an arrangement of fine distribution elements having a special shape.

FIG. 8 shows a variant of FIG. 7, and

DETAILED DESCRIPTION OF THE PREFERRED EXEMPLARY EMBODIMENTS

Figure 9:
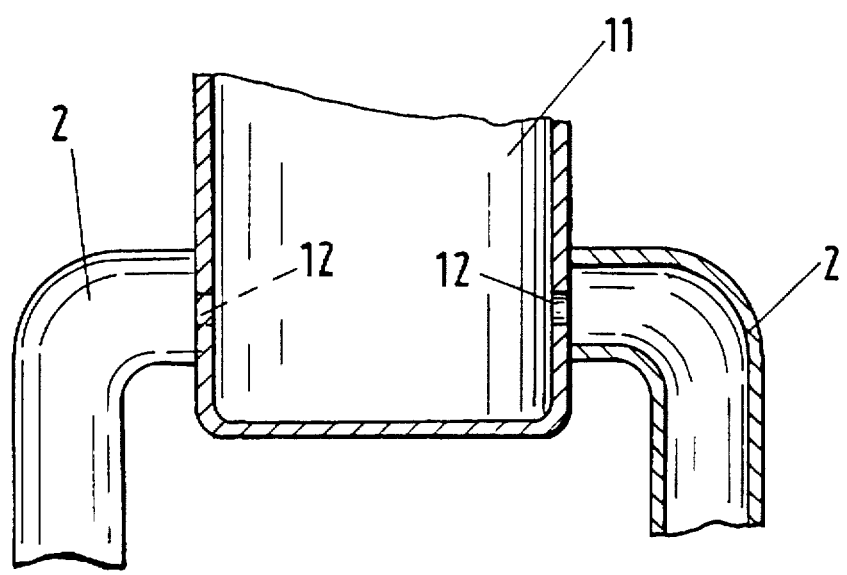
FIG. 9 shows a cross-section through a distribution channel with metering openings in the wall of this channel.

FIG. 1 shows a first variant of an embodiment of a liquid distributor 1 which consists of a main channel 10 and subsidiary channels 11 which are arranged below the main channel and which have fine distribution elements 3. The transfer of liquid from the main channel 10 to the subsidiary channels 11 occurs via metering openings 110. Correspondingly, the fine distribution elements 3 are connected to the subsidiary channels 11 via connection pieces 2, with the liquid outlet openings or metering openings which are named in claim 1 being arranged in these connection pieces 2.

A first working example of the fine distribution element 3 can be seen in FIG. 2. It has the following components: a tubular connection piece 2 with a metering opening 12 and a plate-like element 4 which is contact with a guide wall 5, with a communicating chain of capillary openings forming a distribution zone and drain-off zone 45 between the edge 40 of the element 4 and the guide wall 5, with this chain being circular (or also of elliptic shape) in the present example. The guide wall 5 is made from a foil-like material which has projections and recesses which are achieved by embossing and which are arranged in the manner of a grid. (It would be sufficient if the surface structure 50 were present only on the side of the distribution zone and drain-off zone 45.) At least one passage opening 23 for the liquid to be distributed is located at the transition between the connection piece 2 and the plate-like element 4.

FIG. 3 shows how the fine distribution element of FIG. 2 represented in a longitudinal section can be attached to the subsidiary channel 11 and how the liquid 6 is distributed. The liquid 6 flows through the outlet opening 12 (arrow 60) into the interior of the pipe 2, there flows along the inner wall (arrow 60') to the passage opening 23, and finally moves (arrows 61, 61') as a film or as a rivulet on the plate-like element 4 to the distribution zone and drain-off zone 45, where the liquid is distributed by means of capillary forces over the entire periphery of the zone 45 and thus forms a ring of liquid 62.

Of course, the pipe 2 can have more than one outlet opening. A second outlet opening 12' is shown in FIG. 3, which is arranged at a higher level than the opening 12. If the level of the liquid 6 rises (dot-dash line 6'), then the drain-off increases because of the outlet opening 12' which lies at a higher level.

Because of the effect of the capillary forces, the horizontal liquid transport can occur unevenly on the plate-like element 4. Therefore, the surface of the element 4 does not have to be aligned exactly horizontally. In order to obtain a distribution of the liquid 62 which is as uniform as possible, a deviation from the horizontal position should nevertheless be kept small. It is also an advantage if the surface of the plate-like element 4 which conducts the liquid can easily be wetted.

A further equalizing transfer distribution of the liquid occurs on the guide wall 5 because of the surface structure 50 below the distribution zone and drain-off zone 45. The lines 63 indicate the flow path of the liquid on the guide wall 5. A liquid verge 64 forms at the lower edge 51 of the guide wall 5, from which individual drops 65 continuously detach themselves.

In order for a good distribution effect to result through the surface structure 50 of the guide wall 5, the level difference between the apices of the projections and the bases of the recesses must lie in the region between 0.05 and 1.5 mm, preferably between 0.3 and 0.6 mm. A method is described in CH-PS 664 091 (=P.5928) as to how the surface structure 50 can be manufactured by embossing.

In the second embodiment of the fine distribution element 3 shown as a cutout in FIG. 4, the guide wall 5 is manufactured from a smooth foil. The distribution zone and drain-off zone 45 results from a surface structure which is provided at the edge 40 of the plate-like element 4. In the represented example, this structure consists of tooth-like projections 41 and the recesses 42 lying thereinbetween, as well as a horizontal channel 43.

The example of FIG. 4 additionally shows that the lower edge of the guide wall 5 can be formed in an indented manner with the indentations 52. Discrete drip points are given through the indentations 52 which can also be outwardly and/or inwardly bent.

The guide wall 5 can have holes in further, non-represented embodiments of the invention, which have a positive effect on the transverse distribution of the liquid. The guide wall 5 can also be manufactured from a wire mesh, or it can consist of two layers made from an impermeable foil and an interior wire mesh.

In order for a decreased flow resistance to act on the upwardly flowing gas phase in a substance exchange column in which a liquid distributor in accordance with the invention is arranged, the plate-like elements 4 can additionally be provided with openings 46, as is shown in FIG. 5. A draining of the liquid to be distributed through such openings 47 can for example be prevented via turned-up edges 47.

It is also shown in FIG. 5 that a strip 2' can be provided aside from the tubular connection piece 2, with the strip 2' serving as an attachment means of the fine distributor 3 as well as a discharge surface for the liquid (arrows 60'). As shown in FIG. 6, the outlet opening 12 of the distribution channel 11 can have a certain distance from the connection piece 2', which is bridged by a free stream (arrow 60). A part of the liquid can reach the other side of the connection piece 2' via an opening 13. The liquid can also be directly aimed on the plate-like element 4 as a free stream from the outlet opening 12.

FIGS. 7 and 8 show cutouts of arrangements of respectively four fine distribution elements, the shapes of which strongly diverge from the circular shape. The plate-like elements 4 have edge lines without corners. The radii of curvature of the edge line are preferably larger than approximately 5 mm. Furthermore, the edge line has convex as well as concave regions. Openings 46' (see FIG. 5) are indicated as dot-dash lines in the fine distribution elements of FIG. 7.

The fine distribution elements of FIGS. 7 and 8 are arranged corresponding to their shape in the columns such that the drip points given by the guide walls are largely uniformly distributed over the column cross-section.

FIG. 9 shows a cross-section through a distribution channel 11 having metering openings 12 which are arranged in the wall of this channel 11. The liquid 6 to be distributed enters through the openings 12 respectively into bent, tubular connection pieces 2 which connect the non-represented plate-like elements of fine distributors to the distribution channel 11. The metering openings 12 can also be provided in the bottom of the distribution channel 11.

What is claimed is:

1. A liquid distributor for columns, having liquid outlet openings and fine distribution elements associated with them, which respectively comprise a guide wall, wherein a plate-like element communicating with the guide wall is arranged in each fine distribution element, with a communicating chain of capillary openings forming a distribution zone and drain-off zone between the edge of the element and the guide wall, with this chain extending along a horizontal, closed curve, and in that each outlet opening is a metering opening by means of which a preselectable amount of liquid can be supplied into the associated fine distribution element.

2. A liquid distributor in accordance with claim 1, wherein the guide walls are made from a foil-like material.

3. A liquid distributor in accordance with claim 2, wherein the foil-like material has a surface structure with projections and recesses which are arranged in a grid-like manner at least on the side of the distribution zone and drain-off zone.

4. A liquid distributor in accordance with claim 3, wherein the foil-like material is structured by embossing.

5. A liquid distributor in accordance with claim 3, wherein the level difference between the apices of the projections and the bases of the recesses lies in the region between 0.05 and 1.5 mm.

6. The liquid distributor according to claim 5 wherein the level difference is between 0.3 mm and 0.6 mm.

7. A liquid distributor in accordance with claim 1, wherein the edge of the plate-like element has recesses and projections at the distribution zone and drain-off zone.

8. A liquid distributor in accordance with claim 1, wherein the plate-like elements have liquid-conducting surfaces which can easily be wetted.

9. A liquid distributor in accordance with claim 1, wherein at least a second metering opening is associated with each fine distribution element adjacent to said first metering opening, with the second metering opening lying at a different level compared to the first.

10. A liquid distributor in accordance with claim 1, wherein the plate-like elements are circular or elliptical, with the diameter having values in the order of magnitude of 10 cm.

11. A liquid distributor in accordance with claim 1, wherein the plate-like elements respectively have an edge line without corners.

12. A liquid distributor in accordance with claim 11, wherein the edge line of the plate-like elements has convex as well as concave regions.

13. The liquid distributor according to claim 11 wherein the plate-like elements have a radii of curvature of the edge line larger than approximately 5 mm.

14. A liquid distributor in accordance with claim 1, wherein the plate-like elements respectively have at least one opening with a turned-up edge.

15. A liquid distributor in accordance with claim 1, wherein the plate-like elements are respectively connected to a distribution channel via a connection piece, in that the metering openings are arranged in the walls or in the bottom of the distribution channel, and wherein the metering openings are arranged with respect to the connection pieces such that the liquid to be distributed can be respectively guided to the plate-like element via the connection piece.

16. A liquid distributor in accordance with claim 1, wherein the plate-like elements are respectively connected to a distribution channel via a tubular connection piece and in that at least one hole in the wall of this connection piece forms one of the metering openings.

17. Column with liquid distributors in accordance with claim 1, wherein the fine distribution elements have a special shape and are arranged corresponding to their shape such that the drip points given by the guide walls are largely uniformly distributed over the column cross-section.

* * * * *